May 21, 1929.  L. E. WHITON  1,713,797
POWER TRANSMISSION
Filed Dec. 28, 1925  2 Sheets-Sheet 1

INVENTOR
Lucius E. Whiton
BY
ATTORNEY

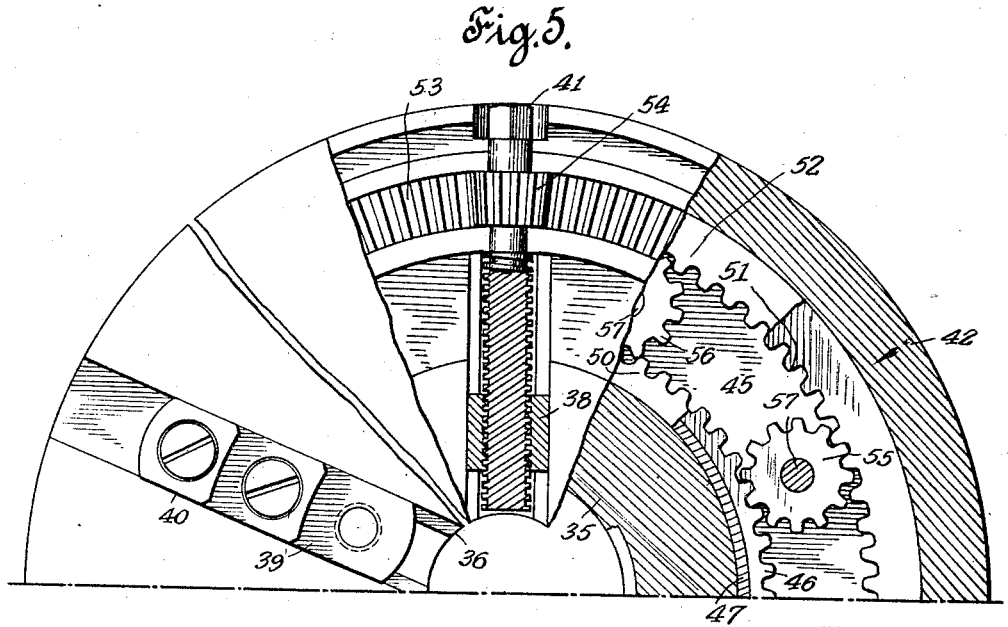

Patented May 21, 1929.

1,713,797

UNITED STATES PATENT OFFICE.

LUCIUS E. WHITON, OF NEW LONDON, CONNECTICUT.

POWER TRANSMISSION.

Application filed December 28, 1925. Serial No. 77,933.

My invention relates particularly to power actuating devices for lathe chucks.

My former application No. 61,173, filed Oct. 8, 1925, shows and describes certain forms of construction and broadly claims certain improvements for operating the jaws of a chuck so that the work may be clamped or released regardless of whether the chuck is stationary or rotating. My present invention relates to mechanism of the same general type and is particularly directed to those chucks in which the jaws are adjusted by means of bevel gears which permit the jaws to be adjusted by means of a hand wrench or by power from a motor or other external source. I have shown herein the principles of the invention as applied to two types of mechanism.

Fig. 4 is a fragmentary longitudinal cross-section view showing the principles of the invention as applied to a chuck in which the jaws are adjusted by radial screws.

Fig. 5 is a partial end view and transverse section of the same.

Figure 1:
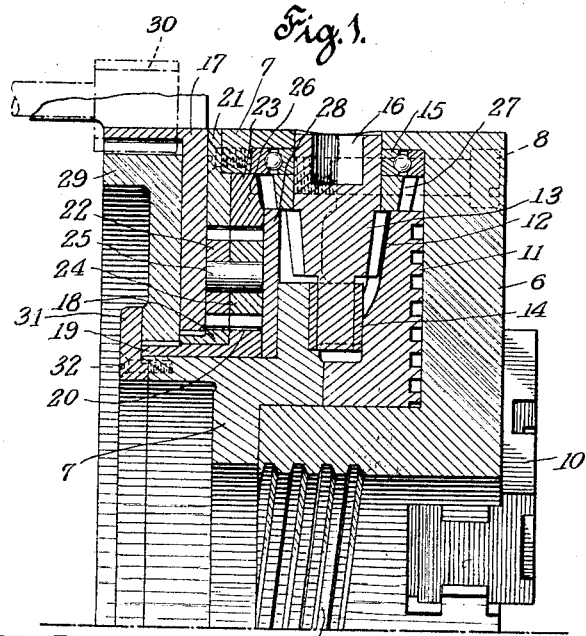
Fig. 1 is a fragmentary longitudinal sectional view of one form of mechanism employing a scroll plate for moving the jaws.
Figure 3:
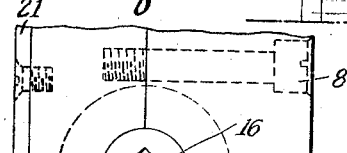
Fig. 3 is a fragmentary edge view and partial section of parts of the same mechanism.
Figure 2:
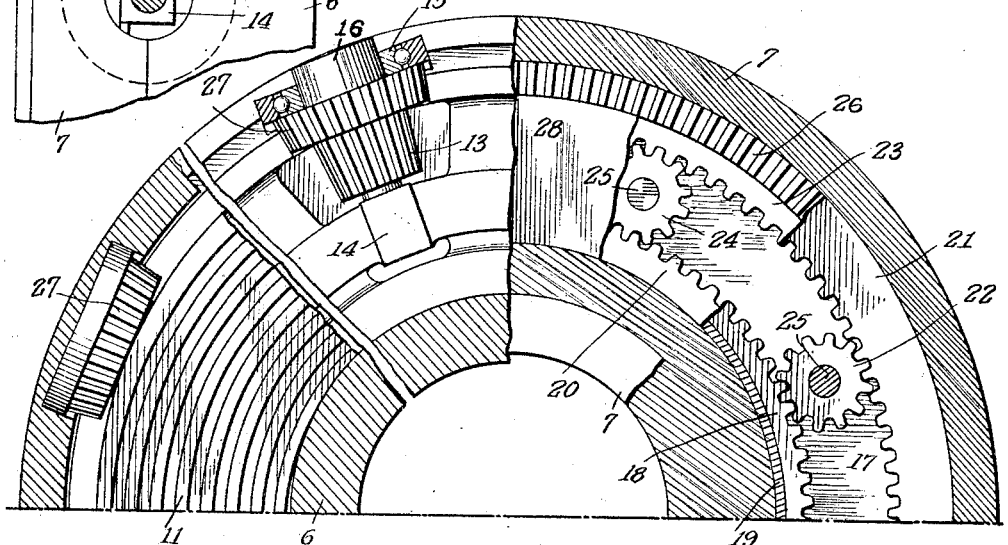
Fig. 2 is a fragmentary transverse sectional view of the same and which also shows certain of the parts in elevation.

In the form shown on Sheet 1 of the drawing, the body of the chuck is formed of two parts, 6 and 7, which are secured together by a series of screws, such as 8. The front part has suitable means for securing the chuck to the lathe spindle. In this instance I have shown interiorly threaded hub 9 adapted to be screwed on to the end of the spindle so as to clamp the back part 7 between the shoulder of the spindle hub of the front part of the body. The front part also carries the radial adjustable jaws or jaw bases 10.

The scroll plate 11 is mounted on the hub of the front part of the body of the chuck in a recess between the parts 6 and 7. This scroll plate has bevel gear teeth 12 on its rear face with which the bevel pinions 13 mesh. These pinions are mounted between the adjacent faces of the parts 6 and 7 of the body and each is provided with a bearing 14 at its inner end and a bearing 15 at its outer end. In this instance the inner bearing 14 is set into a recess in the front of the back member 7 and the outer bearing 15 which is of the annular ball race type is fitted in a counter-bored grove in the rim of the body. Each bevel pinion is provided with a socket 16 adapted to receive a wrench or other tool for applying power by hand.

The member 17 is adapted to be secured to the frame of the lathe or to any other suitable fixed support and is keyed or otherwise suitably secured at its central portion to gear 18. A sleeve 19 which is mounted on the rear body part 7 has gear teeth 20 corresponding in size and number with the gear teeth 18. An annular ring 21 is secured to the back of the body part 7 and provided with teeth facing toward the gear 18. Between the gear teeth on 18 and 21 is mounted a series of pinions 22 which are adapted to roll around gear 18 as the chuck body rotates. A ring 23 mounted alongside of ring 21 has teeth facing toward the teeth on gear 20. Between 20 and 23 is mounted a series of pinions 24 which are connected to pinions 22 by studs 25. Stud 25 may be secured to pinion 22, and the pinion 24 is rotatable on any suitable form of bearing carried by the stud 25. The gear member 23 also has a series of beveled teeth 26 on one side with which a bevel pinion 27 meshes. This pinion 27 is shrunk or keyed firmly on the bevel pinion member 13 so that they may be rotated together. A disc 28 is interposed between the back 7 of the body and the ring 23, pinion 24 and gear 20 so as to prevent interference between the gears at the left and right of the disc 28, as viewed in Fig. 1. An actuator 29 is mounted at the rear of the fixed plate 17 and is keyed to the sleeve 19 which carries gear 20. This actuator 29 may be driven in any suitable manner, as for instance, by pinion 30 from a motor or any power source. Parts of the chuck may be secured together in any suitable manner, as for instance, by means of a washer 31 and a series of screws 32.

In the ordinary operation of the chuck, the parts 17 and 29 are both stationary and consequently the gears 18 and 20 are stationary. Gear 21 is, of course, secured to the chuck body and rotates with it. The gear ring 23 being interlocked with the pinions 27 rotates with the chuck body in the same way that the scroll plate 11 rotates with the chuck body. There is consequently no relative rotation of the scroll plate and the chuck body and, therefore, no radial movement of the chuck jaws. Rotation of the variator or actuator 29 with respect to the plate 17, however, rotates the sleeve 19 and its gear 20 and thus rotates the pinion 24 on its stud 25 and therefore imparts relative rotative movement to the gear ring 23 and the bevel pinion 27. This rotates the bevel member 13 and consequently rotates the scroll plate 11 and thus moves the jaws 10 in or out as the case may be. As the action of the actuator moves the gear ring 23 relative to the ring 21, it is immaterial whether the chuck body is rotating or not, the action of adjustment of the jaws is the same regardless of the movement of the chuck body. This construction and arrangement is simple and compact and yet permits of the radial adjustment of the jaws to the full extent permitted by the size of the body. As none of the parts project inwardly the work may be fed through the center of a hollow spindle. This unobstructed center also permits the use of back feeding tools (not shown) extending through the spindle. Obviously the jaws may be adjusted by hand by the application of suitable tools in the sockets 16 in the usual manner. Although the gear arrangement is simple and compact, it is capable of very powerful gripping action by reason of the high gear ratios between gears 13 and 12, 20 and 23, as well as between 30 and 29.

In the form shown in Figs. 4 and 5 the body of the chuck consists of the members 35 and 36 secured together by a series of screws, such as 37. The member 35 corresponds to a modification of the ordinary face plate by which the chuck is mounted on the lathe spindle (not shown). The front plate 36 has radial grooves for the nuts 38 forming part of the jaw bases 39. Jaws 40 may be secured to the bases 39 in any suitable manner. A radial spindle 41 has a screw thread 41' engaged in the nut 38 for moving the jaws in and out. The spindle 41 is supported in bearings between the face plate 36 and the rings 42 and 43. The ring 42 is secured to the face plate by a series of screws 44.

The plate 45 is stationary, being secured to any suitable part of the machine. A gear member 46 is keyed or otherwise suitably secured to the inner edge of the plate 45 and is mounted on a sleeve 47 which is rotatable on a hub of the body member 35. The actuator or variator 48 is keyed to the sleeve 47 or otherwise suitably secured to it and is adapted to be driven by a pinion 49 from any suitable source of power. The sleeve 47 has a gear 50 with teeth corresponding to the teeth on the gear 46. Ring 42 has gear teeth 51 arranged opposite the gear 46. The gear ring 52 having teeth corresponding to the teeth on gear 50 also has bevel gear teeth 53 meshing with the bevel pinion 54, which is integral with or otherwise fixed to spindle 41. The discs or plates 43 and 45 serve as lateral supports for pairs of pinions 55 and 56 carried by studs 57. The flange 58 at the rear of the body member 35 over-stands the inner edge of the member 48 and thus holds the parts together.

The supporting disc 45 and gear 46 are stationary at all times. In the normal operation, the actuator 48, sleeve 47, and gear 50 are also stationary. The ring 42 being secured to the body part 36 of course rotates with the latter. The ring 52 having its teeth 53 interlocked with the bevel pinion 54 also rotates with the chuck body. Consequently when the chuck body rotates in its normal operation, the pinion members 55 and 56 on the studs 57 simply travel around in the race-way formed between the inner and outer gears and the discs 43 and 45. When it is desired to adjust the jaws inwardly or outwardly, it is simply necessary to turn the variator 48 in one direction or the other relative to member 45. This of course rotates the sleeve 47 which is keyed to it and the gear 50 which is a part of the sleeve. This rotates the pinion 56 on the stud 57 and thus drives the gear ring 52 and rotates the bevel pinion 54 with its screw 42 and consequently moves the jaw in or out, as the case may be, regardless of whether the chuck body in rotating or not.

It should be understood that other modifications and substitutions may be made within the scope of the claims hereinafter set forth.

I claim:

1. A lathe chuck comprising a body having radial guide ways, jaws supported in said guide ways, a radially disposed spindle, a driving connection between said spindle and said jaws, two spur gears arranged side by side, means for holding one of said gears stationary, means for rotating the other gear, annular gears surrounding said spur gears, a series of mated planetary pinions meshing with said spur gears and with said annular gears, means for securing one of said annular gears to said chuck body and a driving connection between the other annular gear and said spindle.

2. In an automatic chuck two similar spur gears, an annular gear surrounding each spur gear, pairs of connected planetary pinions co-acting with said spur and annular gears, flat discs overlapping the said gears and providing lateral bearing surfaces for said pinions, one of said spur gears being stationary, means for rotating the other spur gear, a chuck body secured to one of said annular gears, and jaw adjusting means carried by said chuck body geared to the other annular gear independently of said bearing discs.

3. An automatic chuck comprising a body, radial spindles mounted to rotate therein, a cover plate at one side of said spindles, jaws connected to said spindles, an annular gear geared to said spindles, a gear rotatable on said body, a series of pinions interposed between said gears, an annular gear connected to said body, a stationary gear, a plate supporting said latter gear, a series of pinions interposed between said two last-mentioned gears, a series of shafts connecting the pinions of the two series and guided between said stationary plate and said cover plate, and means for rotating said second mentioned gear.

4. A chuck comprising a body having a recess, spindles mounted to rotate therein, jaws moved by said spindles, an anular gear geared to said spindles, a smaller gear rotatable in said body recess, a series of pinions interposed between said gears, an annular gear secured to said body, a smaller stationary gear, a plate supporting said latter gear, a series of connected pinions interposed between said two last-mentioned gears and connected to the first mentioned pinions and means for rotating said second-mentioned gear.

5. A chuck comprising a body, a spindle mounted to rotate therein, jaws connected to said spindle, an anular gear having a bevelled gear connection with said spindle, a spur gear rotatable in said body, a sleeve connected thereto, a series of pinions interposed between said gears, a second annular gear overlapping and holding the first annular gear, screws connecting said second annular gear to said body, a gear mounted on said sleeve, a stationary plate supporting said latter gear, a series of pinions interposed between said two last-mentioned gears, shafts connecting the pinions of the two series and guided by said stationary plate and means for rotating said spur gear.

6. The combination of two concentrically mounted relatively rotatable members, one of said members having a hub and a flange, an annular gear secured to one of said members, a radial spindle, an annular gear geared to said spindle, a sleeve mounted on said hub and having a gear within one of said annular gears, a second gear mounted on said sleeve within the other annular gear, a pair of pinions having a common shaft and interposed between said outer and inner gears, means for holding one of said inner gears stationary and holding said pinions in place and means for rotating the other inner gear.

7. In an automatic chuck, a body, a jaw operating plate, a stationary plate, a rotatable plate, outer and inner gears secured to two of said plates respectively, a companion gear mounted alongside of each of said outer and inner gears, said companion gears being secured to said body and geared to the third plate respectively, pairs of pinions connecting the outer and inner gears, each pair being mounted on a shaft and guided solely between adjacent surfaces of two of said plates and means for rotating one of said gears with respect to its companion gear.

8. The combination of two concentrically mounted relatively rotatable members, one of said members having a hub, an annular gear, a radial spindle geared between said annular gear and one of said members, a second annular gear fastened to the other member and overlapping the first gear, a sleeve mounted on said hub and having a gear within one of said annular gears, a second gear mounted within the other annular gear, a pair of pinions having a common shaft and interposed between said outer and inner gears, means for holding one of said inner gears stationary, and means for rotating the other inner gear.

9. In a construction of the character described, a stationary plate, a rotatable plate, outer and inner gears secured to said plates respectively, a companion gear mounted along side of each of said outer and inner gears, pairs of pinions connecting said gears, each pair being mounted on a shaft and guided solely between adjacent surfaces of said plates, a body forming a housing for said gears, means for rotating one of said inner gears with respect to its companion gear, one of said outer gears being connected to said body, and radial drivers geared to the other outer gear.

10. The combination of two concentrically mounted relatively rotatable members, one of said members having a hub, annular gears respectively secured to and geared to said members side by side, a sleeve mounted on said hub and having a gear within one of said annular gears, a second gear mounted on said sleeve within the other annular gear, a pair of pinions having a common shaft and interposed between said outer and inner gears, means for holding one of said inner gears stationary and means for rotating the other inner gear.

11. A chuck comprising a body, a jaw operating spindle mounted therein, a sleeve mounted concentrically with said body and having gear teeth, an annular gear geared to said spindle, a pinion mounted to travel between said gears, a gear ring mounted on said sleeve adjacent the gear teeth of said sleeve, an annular gear connected to said chuck body alongside of the first mentioned annular gear, a pinion interposed between said gear ring and the second mentioned annular gear, a shaft connecting said pinions, a stationary plate connected to said gear ring and forming a backing for one of said pinions and one of said annular gears, and a rotatable plate forming a backing for the other pinion.

12. A lathe chuck comprising a body having guide ways, jaws supported in said guide ways, a radially disposed spindle, a driving connection between said spindle and said jaws, two spur gears arranged side by side, means for holding one of said gears stationary, means for rotating the other gear, annular gears surrounding said spur gears, a series of mated planetary pinions meshing with said spur gears and with said annular gears, one of said annular gears being secured to said chuck body and a bevelled gear connection between the other annular gear and said spindle.

13. In a chuck two spur gears, an annular gear surrounding each spur gear, pairs of connected planetary pinions co-acting with said spur and annular gears, discs overlapping the ends of said gears and providing lateral bearing surfaces for said pinions, one of said spur gears being stationary, means for rotating the other spur gear, a chuck body secured to one of said annular gears, jaw adjusting means carried by said chuck body and bevel gears connecting said means to the other annular gear.

14. A lathe chuck comprising a body having guide ways, jaw members supported in said guide ways, radially disposed spindles supported in said body and having bevel pinions, a driving connection between said spindles and said jaw members, two spur gears arranged side by side, means for holding one of said gears stationary, means for rotating the other gear, annular gears surrounding said spur gears, a series of mated planetary pinions meshing with said spur gears and with said annular gears, means for securing one of said annular gears to said chuck body, the other annular gear having bevel gear teeth meshing with the pinions on said spindle.

15. In a chuck two spur gears, an annular gear surrounding each spur gear, pairs of connected planetary pinions co-acting with said spur and annular gears, discs overlapping the ends of said gears and providing lateral bearing surfaces for said pinions, one of said spur gears being stationary, means for rotating the other spur gear, a chuck body secured to one of said annular gears, and jaw adjusting spindles carried by said chuck body and having bevel geared connection to the other annular gear.

16. A chuck comprising a front body part having guide grooves for the jaws, an annular member secured to the body and having interior teeth, a gear ring having interior teeth corresponding to the teeth on said annular member and having bevel gear teeth on one face, a radial spindle supported between said body on one side and said gear ring and annular member on the other and having a bevel pinion co-acting with bevel teeth on said ring, a jaw operator driven by said spindle, a stationary gear, a rotatable gear similar to said stationary gear and planetary set of pinions between said stationary and rotatable gears and the interior teeth on said annular member and on said gear ring.

17. A chuck comprising a body formed of two separable parts, the front part having guide-ways for the jaws, a rotatable jaw operator mounted between the parts of the body for rotation relative to the body, a pair of spur gears mounted side by side and supported by the rear body part, two annular gears arranged to surround the spur gears, means for detachably securing one of said annular gears to the rear body part, a driving gear connection between the other annular gear and the rotatable jaw operator, a pair of planetary pinions mounted to travel between the spur and annular gears, a stud shaft for said pair of pinions, a plate mounted within the body and serving as a lateral bearing wall at one side of the pinions, a relatively stationary plate serving as a lateral bearing wall at the opposite side of the pinions and means for rotating one of the spur gears relative to the other spur gear while the chuck is rotating.

18. A construction of the character described comprising two concentrically mounted relatively rotatable members one of which is formed of two body parts enclosing the other member, an annular gear member secured to and rotatable with the two-part member, the other member having an annular gear alongside of the first mentioned annular gear and also having bevel gear teeth on one side, a radial operating spindle mounted between said body parts and having a bevel pinion meshing with said bevel gear teeth, normally stationary spur gears mounted alongside of each other within the annular gears, a pair of planetary pinions mounted to travel between the spur and annular gears, a common pivot stud for said pinions, lateral bearing plates forming supports for said pinions independently of said pivot stud and means for rotating one of said spur gears relative to the other spur gear while the two-part body is rotating.

19. A chuck having a body with guideways, jaws therein, a scroll plate in the body for moving said jaws, a radial spindle supported in the body and having bevel teeth geared to the back of said scroll plate, an annular gear secured to the body, a second annular gear, bevel teeth on the side of said second annular gear geared to said spindle, two spur gears mounted within the annular gears, pairs of pinions mounted on studs between said spur and anular gears and means for rotating one of said spur gears relatively to the other spur gear when the chuck body is rotating.

LUCIUS E. WHITON.